United States Patent Office 3,311,639
Patented Mar. 28, 1967

3,311,639
PREPARATION OF HYDROCHLORIDE SALTS OF S-METHYL-ISOTHIOUREA DERIVATIVES
Robert Paul Mull, Florham Park, N.J., assignor to Ciba Corporation, New York, N.Y., a corporation of Delaware
No Drawing. Filed Oct. 18, 1963, Ser. No. 317,134
9 Claims. (Cl. 260—309.6)

The present invention concerns the preparation of hydrochloride salts of compounds having the S-methyl-isothiourea moiety.

Salts of compounds having the S-methyl-isothiourea moiety, for example, of S-methyl-isothioureas, S-methyl-thiosemicarbazides, 2-(S-methyl - mercapto)-1,3-diaza-2-cycloalkenes, such as (S-methyl-mercapto)-2-imidazolines and the like, or any other analogous compound are versatile chemical agents useful for the preparation of a variety of compounds, such as guanidino compounds, 3-amino-guanidino compounds, 1,3-diaza-2-cycloalken-2-yl compounds, such as 2-imidazolin-2-yl compounds and the like. The latter compounds have, inter alia, pharmacological properties, particularly antihypertensive or antihyperglycemic effects, and are, therefore, useful as pharmaceuticals, especially in the treatment of hypertensive or hyperglycemic conditions and the like.

The above compounds having the S-methyl-isothiourea moiety are usually prepared by reacting the compounds having the corresponding thiourea moiety, such as thioureas, thiosemicarbazides, 1,3-diaza-cycloalkan-2-thiones, such as imidazolidin-2-thione and the like, or any other analogous compound, with a methylating reagent, particularly a reactive ester formed by methanol and a strong mineral acid, especially a methyl halide, and primarily methyl iodide (Bernthsen et al., Ber., vol. 11, p. 493 (1878)), or di-methyl sulfate (Taylor, J. Chem. Soc., vol. 111, p. 655 (1917)).

The S-methyl-isothiourea compounds resulting from such reaction are obtained in the form of their acid addition salts, especially the hydrohalides, and above all the hydriodides, or the sulfates. While methyl iodide and dimethyl sulfate are convenient reagents (for example, they are very reactive, and can be used in an open vessel even at moderately elevated temperatures), they also yield acid addition salts, i.e., the hydriodides and the sulfates, of resulting S-methyl-isothiourea compounds which are not as desired as other acid addition salts, particularly the hydrochlorides. Thus, if the above hydriodides and sulfates of compounds having the S-methl-isothiourea moiety are used as reagents in the manufacture of guanidino compounds, 3-amino-guanidino compounds, or 1,3-diaza-2-cycloalken-2-yl compounds, e.g., 2-imidazolin-2-yl compounds and the like, having pharmacological activities, the latter are obtained in the form of their hydriodides or sulfates. Apart from the fact that hydriodide salts of pharmacologically active compounds are not particularly desired from a physiological point of view, the salts with hydriodic acid and sulfuric acid, due to their great molecular weight, add a considerable amount of physiologically inactive material to the molecular weight of a pharmacologically active base. Salts with an acid having a much lower molecular weight and adding only little to the molecular weight of a physiologically active base, particularly the hydrochlorides, are, therefore, preferred.

It is, therefore, desirable to use other salts of compounds having the S-methyl-isothiourea moiety, particularly the hydrochloride salts, as reagents for the preparation of guanidines, 3-aminoguanidines, 1,3-diaza-2-cycloalkenes and the like.

However, the direct preparation of the hydrochloride salts of compounds having the S-methyl-isothiourea portion cannot be achieved easily. Methyl chloride, having a boiling point of −24° C., is a highly volatile reagent and requires a closed reaction vessel when reacted with a compound having the thiourea moiety (Short et al., J. Med. Chem., vol. 6, p. 275 (1963)). Another way of preparing, for example, S-methyl-isothiourea hydrochloride from thiourea is the reaction of the latter with methyl chloroformate to form the intermediate methyl isothioallophanate hydrochloride, which yields the desired hydrochloride salt upon heating to its melting point (Dixon, J. Chem. Soc., vol. 83, p. 567 (1903)); however, this procedures involves the use of a more expensive reagent.

A further possibility of preparing the hydrochloride salts of compounds having the S-methyl-isothiourea moiety comprises converting one of the easily prepared salts of such compounds into the desired hydrochlorides. This has been achieved, for example, by reacting the S-methyl-isothiourea sulfate with barium chloride (Arndt, Ber., vol. 54, p. 2241 (1921)); however, this method requires the removal of the resulting barium sulfate from the reaction mixture.

I have now found a convenient method for the conversion of the easily prepared hydriodide salts, as well as the hydrobromic salts, of compounds having the S-methyl-isothiourea moiety into the corresponding hydrochloride salts, which comprises evaporating the volatile portion from a mixture of the hydriodide salt or the hydrobromide salt of a compound having the S-methyl-isothiourea moiety and at least one mole of hydrogen chloride gas in methanol.

Although the methanol does not have to be anhydrous, it is advantageous to use dry methanol. Usually, the hydrogen chloride gas is added to the methanol by bubbling the gas through the solvent, and the starting material is then given to the resulting solution of the hydrogen chloride in methanol. Theoretically, the hydriodide salt or the hydrobromide salt of the starting material containing an S-methyl-isothiourea portion is converted into the corresponding hydrochloride salt by reacting it with one mole of hydrogen chloride. However, the preferable open flask reaction is bound to cause some loss of the volatile gaseous hydrogen chloride, and the latter is, therefore, used in an excess amount of up to about ten moles.

As mentioned above, the reaction is preferably carried out in an open vessel, and the volatile portion of the reaction mixture, i.e., the methanol, an excess of hydrogen chloride and the resulting hydrogen iodide or hydrogen bromide, is evaporated by heating the reaction mixture to reflux.

The resulting hydrochloride salt of a compound containing an S-methyl-isothiourea moiety may be used as a reagent without further purification, or may be purified by recrystallization and the like.

The starting materials used in the above reaction are known or are prepared from compounds having the thiourea moiety according to known methods, i.e., by reaction with methyl iodide or methyl bromide; hydrobromide salts used as starting materials may also be formed by treating the hydriodide salt of a compound having an S-methyl-isothiourea moiety with hydrogen bromide in methanol according to the above procedure. Preferred starting materials are the hydriodides of S-methyl-isothiourea compounds, having preferably the following formula

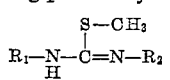

in which each of the groups $R_1$ and $R_2$ is hydrogen or an organic radical, such as an aliphatic group, particularly an alkyl, e.g., methyl, ethyl, n-propyl, isopropyl, n-butyl and the like, the hydriodides of S-methyl-isothiosemicarbazides especially those of the formula

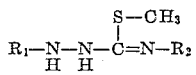

in which $R_1$ and $R_2$ have the previously given meaning, or the hydriodides of 2-(S-methyl-mercapto)-1,3-diaza-2-cycloalkenes, in which the 1,3-diaza-2-cycloalkene portion has from five to seven ring members, particularly those of the formula

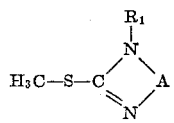

in which $R_1$ has the previously given meaning, and A is lower alkylene separating the two nitrogen atoms by two to four carbon atoms, especially the hydriodides of 2-(S-methyl-mercapto)-2-imidazolines, such as those of the formula

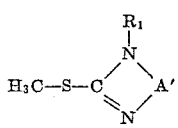

in which $R_1$ has the previously given meaning, and A' is lower alkylene separating the two nitrogen atoms by two carbon atoms.

The following examples are intended to illustrate the invention and are not to be construed as being limitations thereon. The temperatures are given in degrees centigrade.

*Example 1*

A solution of 17.44 g. of S-methyl-isothiourea hydriodide in 160 ml. of methanol containing 22 g. of hydrogen chloride in an open vessel is evaporated on a steam bath. After cooling, the residue is treated with diethyl ether, and the desired S-methyl-isothiourea hydrochloride solidifies. It melts at 113–116° after recrystallization from a mixture of ethanol and diethyl ether and drying for forty-eight hours at 45° under reduced pressure; yield: 9 g. (89 percent of theory).

*Example 2*

A solution of 4.66 g. of S-methyl-isothiosemicarbazide hydriodide in 35 ml. of methanol containing 5.4 g. of hydrogen chloride in an open vessel is allowed to evaporate while heating on the steam bath. After cooling and adding diethyl ether, the S-methyl-isothiosemicarbazide hydrochloride solidifies and is recrystallized from ethanol, M.P. 159–162°; yield, 11.9 g. (84 percent of theory).

*Example 3*

A solution of 4.92 g. of N,N',S-trimethyl-isothiourea hydriodide in 40 ml. of methanol containing 5.5 g. of hydrogen chloride in an open vessel is evaporated while heating on a steam bath. The residue is treated with diethyl ether, and the resulting N,N',S-trimethyl-isthiourea hydrochloride is recrystallized from a mixture of ethanol and diethyl ether, M.P. 177–179°; yield: 2.4 g. (78 percent of theory).

*Example 4*

A total of 3.42 g. of S-methyl-isothiourea hydrobromide is added to 40 ml. of absolute methanol containing 5.5 g. of hydrogen chloride. The resulting solution is evaporated in an open vessel while heating on a steam bath and the residue is recrystallized from a mixture of ethanol and diethyl ether to yield the S-methyl-isothiourea hydrochloride, which melts at 113–116° after drying for sixteen hours at 30° under reduced pressure.

The starting material used in the above procedure is prepared as follows: A solution of 76 g. of methyl bromide in 200 ml. of absolute methanol is added to a solution of 38 g. of thiourea in 450 ml. of methanol. After stirring for twenty minutes at room temperature, the reaction mixture is refluxed for one hour and then allowed to stand overnight at room temperature. It is diluted with diethyl ether, and the resulting precipitate is filtered off and recrystallized from a mixture of methanol and diethyl ether. The desired S-methyl-isothiourea hydrobromide melts at 85–89°; yield: 48.3 g.

The starting material may also be prepared as follows: A solution of 4.36 g. of S-methyl-isothiourea hydriodide in 40 ml. of absolute methanol containing 12.15 g. of hydrogen bromide is evaporated on the steam bath. The resulting S-methyl-isothiourea hydrobromide is recrystallized from a mixture of methanol and diethyl ether, M.P. 85–91°.

*Example 5*

To a solution of 22.0 g. of hydrogen chloride in 160 ml. of absolute methanol is added 19.52 g. of 2-(S-methyl-mercapto)-2-imidazoline hydriodide; the reaction mixture is evaporated to dryness in an open vessel, and the residue is recrystallized from a mixture of ethanol and diethyl ether to yield the 2-(S-methyl-mercapto)-2-imidazoline hydrochloride, M.P. 170–173°, after drying for sixteen hours at 30° and under reduced pressure; yield: 11.1 g. (88.7 percent of theory).

*Example 6*

A mixture of 5.2 g. of 1-(2-aminoethyl)-1,2,3,4,5,6,7,8-octahydro-azocine and 3.0 g. of S-methyl-isothiourea hydrochloride in 25 ml. of ethanol is refluxed for six hours. The resulting reaction mixture is concentrated under reduced pressure and then cooled, whereupon a precipitate is formed which is filtered off and recrystallized to yield the 1-(2-guanidino ethyl)-1,2,3,4,5,6,7,8-octahydro-azocine hydrochloride, M.P. 115–117°.

*Example 7*

A mixture of 8.55 g. of 1-(2-aminoethyl)-4-methyl-piperazine and 8.32 g. of S-methyl-2-isothiosemicarbazide hydrochloride in 25 ml. of water is refluxed for 4½ hours. After the strong evolution of methyl-mercaptan subsides, the solution is concentrated under reduced pressure and the residual oil crystallizes on cooling. The 3-amino-1-[2-(4-methyl-1-piperazino)-ethyl]-guanidine hydrochloride is purified by recrystallization from a mixture of ethanol and acetonitrile, M.P. 156–159°.

What is claimed is:

1. Process for the preparation of hydrochloride salts of compounds having the Formula I

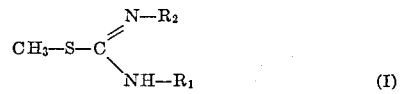

in which $R_1$ stands for a member selected from the group consisting of hydrogen, lower alkyl, amino and lower alkylamino, $R_2$ for a member selected from the group consisting of hydrogen and lower alkyl, $R_1$ and $R_2$ taken together also represent lower alkylene separating the nitrogen atoms by 2 to 4 carbon atoms, which comprises evaporating the voltaile portion from a mixture containing a member selected from the group consisting of the hydrobromide salt and the hydriodide salt of said compound of Formula I and at least one mole of hydrogen chloride in methanol.

2. Process according to claim 1, which comprises using anhydrous methanol.

3. Process according to claim 1, which comprises using an excess of hydrogen chloride.

4. Process according to claim 1, which comprises evaporating the volatile portion of the reaction mixture in an open vessel.

5. Process according to claim 1, which comprises using S-methyl-isothiourea hydriodide as the starting material.

6. Process according to claim 1, which comprises using S-methyl-isothiourea hydrobromide as the starting material.

7. Process according to claim 1, which comprises using S-methyl-thiosemicarbazide hydriodide as the starting material.

8. Process according to claim 1, which comprises using a 2-(S-methyl-mercapto)-2-imidazoline hydroiodide as the starting material.

9. Process according to claim 1, which comprises using N,N',S-trimethyl-isothiourea hydriodide as the starting material.

References Cited by the Examiner

UNITED STATES PATENTS

| | | | |
|---|---|---|---|
| 2,039,514 | 5/1936 | Battegay | 260—564 |
| 2,680,745 | 5/1954 | Craig et al. | 260—309.6 |
| 2,708,679 | 5/1955 | Lo et al. | 260—564 |
| 3,010,972 | 11/1961 | Kaiser et al. | 260—563 |
| 3,117,128 | 1/1964 | Mooradean | 260—294.3 |

OTHER REFERENCES

Miller et al.: Science, volume 112, pages 654–5 (1950).

WALTER A. MODANCE, *Primary Examiner.*

NATALIE TROUSOF, *Assistant Examiner.*